(No Model.)
T. COGSWELL.
DENTAL TOOL.
No. 312,092. Patented Feb. 10, 1885.
Fig:1.
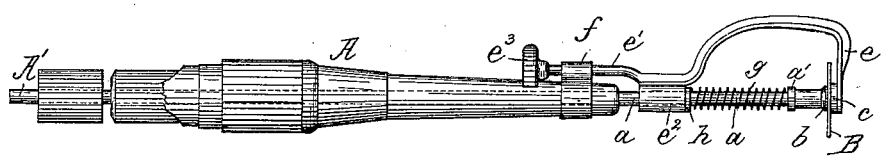
Fig:2.
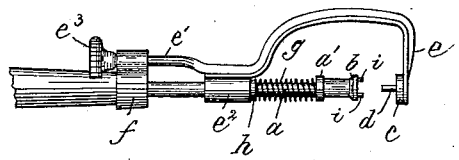
Fig:3.
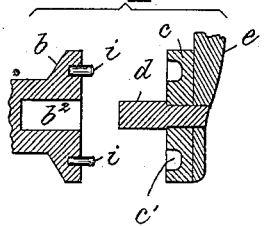
Witnesses.
Arthur Lippitten.
John F. C. Printkirk.
Inventor.
Thomas Cogswell
by Crosby & Gregory
attys.

UNITED STATES PATENT OFFICE.

THOMAS COGSWELL, OF WELLESLEY HILLS, MASSACHUSETTS.

DENTAL TOOL.

SPECIFICATION forming part of Letters Patent No. 312,092, dated February 10, 1885.

Application filed November 17, 1884. (No model.)

*To all whom it may concern:*

Be it known that I, THOMAS COGSWELL, of Wellesley Hills, county of Norfolk, State of Massachusetts, have invented an Improvement in Dental Apparatus, of which the following description, in connection with the accompanying drawings, is a specification, like letters on the drawings representing like parts.
My invention, relating to dental apparatus, consists, essentially, in a novel device for holding abrasive disks or wheels upon the rotating arbors or spindles of the hand-pieces of dental engines of usual construction.
Heretofore the abrasive disks or wheels employed in dental operations have usually been connected with a spindle or arbor by means of a screw or nut, the manipulation of which required considerable time when applying or removing disks, and as it is frequently necessary to change the disks during an operation any unnecessary delay becomes a matter of great annoyance not only to the operator but to the patient.
My invention consists in a clamp or holder composed of two members, one of which is made movable away from and toward the other, one of the said members being a hub or plate connected to and rotated in unison with the arbor or spindle, while the hub or plate of the other member has an independent bearing at its outer side in the line of the axis of the arbor or spindle. In this instance of my invention the hub of the member last referred to is mounted loosely upon its bearing, which latter has as its support a bracket, which is held in place by or through the hand-piece or case of the dental engine or by the spindle or arbor, and hence the bracket does not rotate in unison with the arbor or spindle and disk. One member of the clamp or holder will preferably be provided with one or more pins or projections, or with a single central pin or projection having an angular or irregular cross-section, to engage the disk and cause it to rotate with the spindle or arbor. The arm or bracket supporting the movable member of the clamp, as shown, in this instance is acted upon by a spring, which tends to press it against the other member, and the said bracket is preferably provided with a handle or thumb-piece, by which it may be quickly operated by the hand holding the usual hand-piece of the engine.

Figure 1 is a side elevation of the hand-piece of a dental engine provided with a clamp or holder embodying my invention, the said clamp or holder being shown as confining an abrasive disk in operative position, the outer shell of the hand-piece being partially broken away. Fig. 2 is a side elevation of the arbor and clamp or holder, the members of which are shown as separated to receive a disk, and Fig. 3 is a longitudinal sectional detail of the clamp enlarged.

My improvements may be used in connection with well-known hand-pieces of dental engines for operating rotating tools of various kinds, the hand-piece A containing the usual rotating shaft, A', of the engine and a suitable chuck, (not shown,) by which the arbors or spindles which operate the different tools may be connected and rotated in unison with the said shaft.

The hand-piece herein shown is substantially the same as in Letters Patent No. 261,795, granted July 25, 1882, to which reference may be had for the construction and operation of the shaft and chuck.

The apparatus forming the subject of the present invention for holding rotating wheels or disks comprises an arbor or spindle, *a*, adapted to be connected by the usual chuck to the usual rotating shaft of the engine, the said arbor being provided at its end with one member of the disk-holder clamp, said member consisting, essentially, of a flange or collar, *b*, adapted to contact with one side of the abrasive disk or wheel B at or near the center thereof. The flange *b* (shown in Figs. 1 and 2) is fixed to or made integral with the arbor or spindle *a*, and so constructed it has only a movement of rotation with relation to the hand-piece. The other or outer member, C, of the clamp or holder consists of a hub or plate, *c*, mounted so as to rotate freely with relation to the bracket *e*, the bearing *d* for the said hub or plate being shown as a pin or projection held in an arm of a bracket or support, *e*, which may be connected to and sustained by the hand-piece A or by the arbor *a*. As herein shown, the bracket *e* has a shank or stem, *e'*, which is free to slide longitudinally in an ear or lug, *f*, which may be frictionally or otherwise placed and held upon the end of the hand-piece A to prevent its rotation. The bracket e has a sleeve, $e^2$, which fits loosely the arbor a, so as to have a free longitudinal movement thereon, a spring, g, interposed between the flange or shoulder $a'$ on the arbor a, and the said sleeve $e^2$, or a washer, h, between the said spring and sleeve, tending to move the bracket e with the hub or member c toward the flange b or the abrasive disk or wheel A, placed between the said members.

In order to positively engage the disk or wheel B, so that it will rotate with the arbors, one of the members of the clamp is provided with one or more prongs or projections, i, or with a single central pin or projection having an angular or irregular cross-section to pass through a corresponding hole in the disk B, so that the latter cannot slip or turn independently of the flange b and arbor a. The hub or plate c in this instance has an annular groove, $c'$, as shown in Fig. 3, to receive the prongs or projections i and the bearing d, on which the washer c turns, projecting beyond the face of the said washer, and enters a recess, $b^2$, in the co-operating member b of the clamp. The bracket e is provided with a handle or thumb-piece, $e^3$, and when the operator desires to remove a disk or wheel, B, and replace it by another, this can be done by pressing the bearing e by the thumb or finger of the hand holding the hand-piece A forward or away from the member b of the clamp or holder, as shown in Fig. 2, when a disk or wheel may be at once removed from or inserted between the members of the clamp, after which, by removing the pressure of the thumb or finger on the thumb-piece $e^3$, the spring g will press or force the bracket and member c of the clamp into engagement with the disk or wheel placed between them.

When desired, the entire disk-holding apparatus may be removed from the hand-piece A, the arbor a being disengaged from the chuck and the lug f slipped off from the end of the hand-piece.

If desired, that part of the ear or lug f at the left of the sleeve $e^2$ may be omitted. The sleeve $e^2$, with its loose bearing on the arbor or spindle a, does not rotate therewith, as rotation of the said bracket may be readily prevented by one finger of the operator.

The invention is not limited to the exact construction illustrated, as it is obvious that various modifications may be made therein without departing from the invention.

I claim—

1. The arbor or spindle and clamp member connected to and rotating in unison therewith, combined with the support or bracket and co-operating member c, having its bearing held thereby in the line of the axis of the arbor or spindle, substantially as described.

2. The arbor and clamp member b thereon, combined with the co-operating clamp member c and supporting-bracket therefor, provided with a sleeve engaging the said arbor, substantially as described.

3. The arbor and clamp member b thereon, combined with the co-operating clamp member c, its supporting-bracket, and a spring, whereby the said clamp members are normally pressed toward one another, substantially as described.

4. The arbor and fixed and movable clamp members b c, co-operating as described, combined with a disk-engaging prong for positively connecting the disk with the arbor, substantially as described.

5. The arbor and clamp member fixed thereon, provided with a prong, combined with the hub or plate c, constituting the other clamp member, the latter having an annular groove to receive the said prong, substantially as described.

6. The arbor a, having a clamp member, b, fixed thereto, and provided with a recess, $b^2$, combined with the movable bracket provided with a pin to enter the said recess, and a hub or plate, e, free to rotate on said pin, substantially as described.

In testimony whereof I have signed my name to this specification in the presence of two subscribing witnesses.

THOMAS COGSWELL.

Witnesses:
G. W. GREGORY,
B. J. NOYES.